United States Patent
Egawa et al.

[11] Patent Number: 6,116,828
[45] Date of Patent: Sep. 12, 2000

[54] GEAR CUTTING METHOD AND APPARATUS

[75] Inventors: Tsuneo Egawa; Yozo Nakamura; Satoshi Morimoto; Hirofumi Kage; Yukihisa Nishimura, all of Kyoto, Japan

[73] Assignee: Mitsubishi Heavy Industries, Ltd., Tokyo, Japan

[21] Appl. No.: 09/058,363

[22] Filed: Apr. 10, 1998

[30] Foreign Application Priority Data

Apr. 10, 1997 [JP] Japan ................................. 9-091988
Jun. 6, 1997 [JP] Japan ................................. 9-148997

[51] Int. Cl.$^7$ .............................. B23F 5/00; B23C 21/16
[52] U.S. Cl. .............................. 409/12; 407/23; 407/119; 409/11
[58] Field of Search ................... 409/1, 11, 12, 409/13, 26, 51; 451/148; 407/23, 26, 119; 428/698

[56] References Cited

U.S. PATENT DOCUMENTS

| | | | |
|---|---|---|---|
| 4,594,294 | 6/1986 | Eichen et al. | 428/698 X |
| 4,717,632 | 1/1988 | Keem et al. | 428/698 |
| 5,030,038 | 7/1991 | Ariura | 407/26 |
| 5,586,848 | 12/1996 | Suwlun | 409/137 |
| 5,656,383 | 8/1997 | Tanaka et al. | 428/698 |

FOREIGN PATENT DOCUMENTS

| | | | |
|---|---|---|---|
| 162656 | 11/1985 | European Pat. Off. | 407/119 |
| 4221057A | 8/1992 | Japan . | |
| 453642 B2 | 8/1992 | Japan . | |
| 567705 B2 | 9/1993 | Japan . | |
| 406015504 | 1/1994 | Japan | 407/119 |
| 9104966A | 4/1997 | Japan . | |
| 2644710B2 | 5/1997 | Japan . | |

OTHER PUBLICATIONS

Gear Technology, Nov./Dec. 1994.
Werner, Proceeding of Schmalkalde Tool Meeting, vol. 2—"Current Status of Dry Cutting by Use of Powder Mettallurgical High–Speed Steel and Cemented Carbide Tools" (partial translation provided).
Faulstich, Ingo, German Industrial Forum for Technology, Oct. 19 and 20, 1995, "Dry Machining of Cylindrical Gearwheels by Hobbing" (partial translation provided of Sections 2, 2.1, and 2.1.1.

(List continued on next page.)

*Primary Examiner*—William Briggs

[57] ABSTRACT

Gear cutting is to be effected in high efficiency and at low cost. To this end, using a hob 16 coated with at least one layer of a film of a composition comprising:

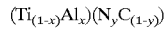

$$(Ti_{(1-x)}Al_x)(N_yC_{(1-y)})$$

$0.2 \leq x \leq 0.85$ $0.25 \leq y \leq 1.0$, dry cutting is performed at a cutting speed in the range of 80 to 400 m/min without using a cutting oil. Teeth can be generated at a greatly improved cutting speed without using any expensive tool such as a tool made of cemented carbide.

29 Claims, 13 Drawing Sheets

OTHER PUBLICATIONS

Kono, Kenyu, Machine Technology, Sep. 1996, vol. 44, No. 9, pp. 44–47 — "Effective Use of Gear–Cutting Tools 1" (partial translation provided for marked sections on pp. 45–46.

Kase, Shin; Partical Machining Textbook, Daily Industrial Newspaper Co., Ltd., p. 145, lines 2 and 16.

Machining Techique Handbook, Revised and Enlarged Edition, edited by Machining Technique Handbook Editor's Committee: Daily Industrial Newspaper Co., Ltd. . , p. 431, lines 4–8 and p. 432, lines 8–11.

Kitaura, Sei–ichiro and Torii, Nobuyoshi; Practice in Cutting of a Hard Material, Dec. 1994, p. 21.

Kusakabe, Yuji, Mizuta, Mitsuo, and Arai, Kunihiko; Cutting Performance of (Ti,Al)N Coated Gear Hobs, Kobe Steel Engineering Reports, vol. 41, No. 3 (1991), p. 43.

Yamada, Yasuyuki, Aoki, Taiitu, Tanaka, Yusuki, Hayasaki, Hiroshi and Motonishi, Suguru; High Speed Cutting Performance of (Al, Ti) N Coated Carbide Endmills, pp. 211–216.

"Werkstatt und Betrieb," Trocken wälzfräsen mit Hartmetall, 128 (1955) 9 (Germany), p. 789–792 (partial translation provided for marked sections on pp. 789–790).

GEAR CUTTING METHOD AND APPARATUS

BACKGROUND OF THE INVENTION

1. Field of the Invention

The present invention relates to a gear cutting method and apparatus for generating teeth with use of a hob having a cutting edge portion made of a high-speed tool steel.

2. Description of the Prior Art

A conventional hobbing machine will be described below with reference to FIGS. 12 and 13, of which FIG. 12 illustrates an entire construction of the conventional hobbing machine and FIG. 13 illustrates the details of a cutting portion.

As shown in FIG. 12, a work 3 is supported on a hobbing machine 1 through a mounting means 2, and a hob 5 having a cutting edge portion made of a high-speed steel is supported by a hob head 4 so that it can be driven rotatively. As shown in FIG. 13, the mounting means 2 is supported by a table 6, and the work 3 is adapted to rotate with rotation of the table 6. A hob spindle 7 is attached to the hob head 4 so that it can be driven rotatively. The hob 5 is fixed to the hob spindle 7 so as to be rotated by operation of the hob spindle 7. In FIG. 13, numeral 8 denotes a nozzle for supplying a cutting oil 9 to the cutting portion.

For generating teeth on the work 3 by means of the hobbing machine 1, the work is loaded onto the table 6 through the mounting means 2 and the hob 5 is fixed to the hob spindle 7 in the hob head 4. Then, the table 6 is rotated to rotate the work 3 and likewise the hob spindle 7 is rotated to rotate the hob 5. In this rotating state of the hob 5 and the work 3, the hob is allowed to cut into the work, with the result that the outer periphery of the work is cut out by the cutting edge portion of the hob to generate teeth.

Since hobbing is a gear cutting method using a similar motion to the gear meshing motion, the number of revolutions of the hob 5 and the work 3 and the depth of cut of the hob are determines so as to generate predetermined teeth on the outer periphery of the work. During the gear cutting work, the cutting oil 9 is fed from the nozzle 8 to the cutting portion to lubricate and cool the cutting portion.

In order to reduce the machining cost in teeth generation by the hobbing machine 1, it is necessary that the machining be carried out in a short time. In the present situation, however, the peripheral speed (cutting speed) of the cutting edge portion of the hob 5 is 120 m/min or so at most due to the wear of the hob 5, for example, and thus a limit has been encountered in the rotational speed of the hob 5 and shortening of the machining time. This is presently an obstacle to the reduction of the machining cost.

Recently, a high-speed machining technique with a cutting speed of 200 to 300 m/min using a hob made of cemented carbide has been developed, and thus the generation of teeth by a hobbing machine has become more efficient. In the case of using a hob made of cemented carbide, a heat crack will develop if machining is performed under the supply of cutting oil, because cemented carbide is fragile. For this reason, in the case of using a hob made of cemented carbide, a dry cutting method in which machining is performed without the supply of cutting oil is mainly adopted. Since cemented carbide is much higher in both heat resistance and wear resistance than the high-speed steel, no problem occurs even if such a dry cutting is performed.

As mentioned above, the machining efficiency is improved by using a hob of cemented carbide and it may become possible to reduce the machining cost by the increased cutting speed. However, the hob of cemented carbide is so expensive that the total cost becomes extremely high even if the machining efficiency is improved. In addition, since cemented carbide is fragile, there is a fear that a sudden crack may occur. For this reason, the hob of cemented carbide is not presently in wide practical use.

SUMMARY OF THE INVENTION

The present invention has been accomplished in view of the above-mentioned circumstances and it is an object of the invention to provide a gear cutting method capable of greatly improving the cutting speed without using a tool of cemented carbide.

According to the present invention, for achieving the above-mentioned object, there is provided a gear cutting method for teeth generation with use of a hob having a cutting edge portion made of a high-speed tool steel, wherein the hob is coated with at least one layer of a film of a composition comprising:

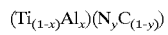

$$(Ti_{(1-x)}Al_x)(N_yC_{(1-y)})$$

$0.2 \leq x \leq 0.85$ $0.25 \leq y \leq 1.0$ and wherein teeth are generated by dry cutting without using a cutting oil at a cutting speed in the range from 80 m/min to 400 m/min while air is blown against a cutting portion.

DETAILED DESCRIPTION OF PREFERRED EMBODIMENTS

Figure 1:
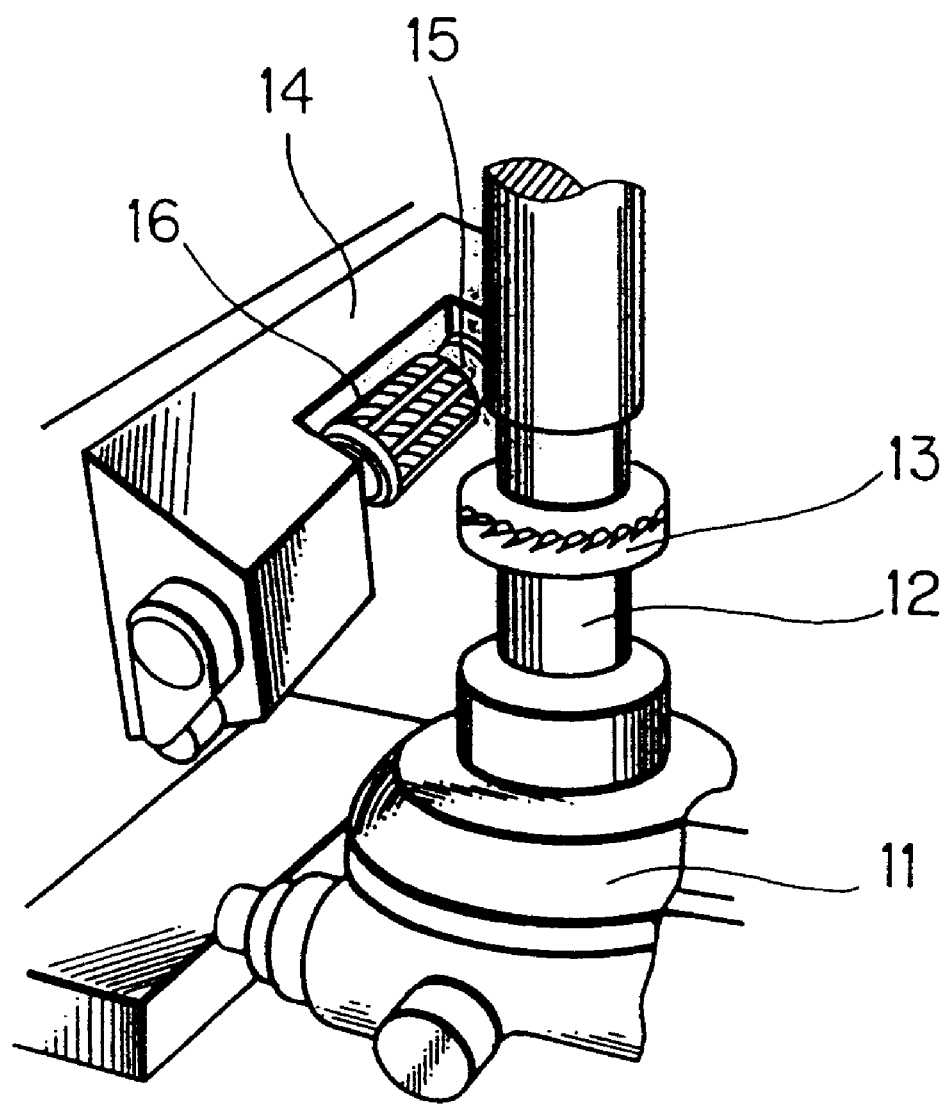
FIG. 1 is a schematic construction diagram of a cutting portion of a hobbing machine which is employable for carrying out the gear cutting method of the present invention.

The construction of a hobbing machine employable for carrying out the gear cutting method of the present invention will be described below with reference to FIG. 1. FIG. 1 schematically illustrates a cutting portion of the hobbing machine.

In the hobbing machine, as shown in the same figure, a table 11 is supported rotatably and a work 13 is carried on the table 11 through a mounting means 12. Further, a hob head 14 is provided so as to be movable toward and away from the table 11, and a hob spindle 15 is supported by the hob head 14 so that it can be driven rotatively. A hob 16 made of a high-speed steel and having a cutting edge portion is fixed onto the hob spindle 15. The hob 16 is rotated with rotation of the hob spindle 16, and as the hob head 14 moves toward the table 11, the hob is fed for cutting into the work.

For teeth generation on the work 13 with use of the hobbing machine, the work 13 is loaded onto the table 11 through the mounting means 12 and the hob 16 is fixed onto the hob spindle 15 of the hob head 14. The table 11 is then rotated to rotate the work 13 and at the same time the hob spindle 15 is rotated to rotate the hob 16. With the hob 16 and the work 13 being rotated synchronously, the hob is allowed to cut into the work, whereby the outer periphery of the work is cut out by the cutting edge portion of the hob 16 to generate teeth. The gear cutting operation is performed by a dry cutting method without the supply of cutting oil.

As the hob 16, a hob made of a high-speed steel and coated with nitride of TiAl or carbonitride of TiAl is used. The hob 16 may be coated with TiAl nitride or carbonitride in a single-layer or even a multi-layer insofar as any one layer contains one of the materials.

A first embodiment of the gear cutting method of the present invention using the above hobbing machine will now be described. As the hob 16, a hob made of a high-speed tool steel (Japanese Industrial standards: JIS: SKH55) and coated with a single 1.7 $\mu$m thick layer of $(Ti_{(1-x)}Al_x)N$ is used, and gear cutting is performed without the supply of cutting oil (dry cutting method).

Figure 2:
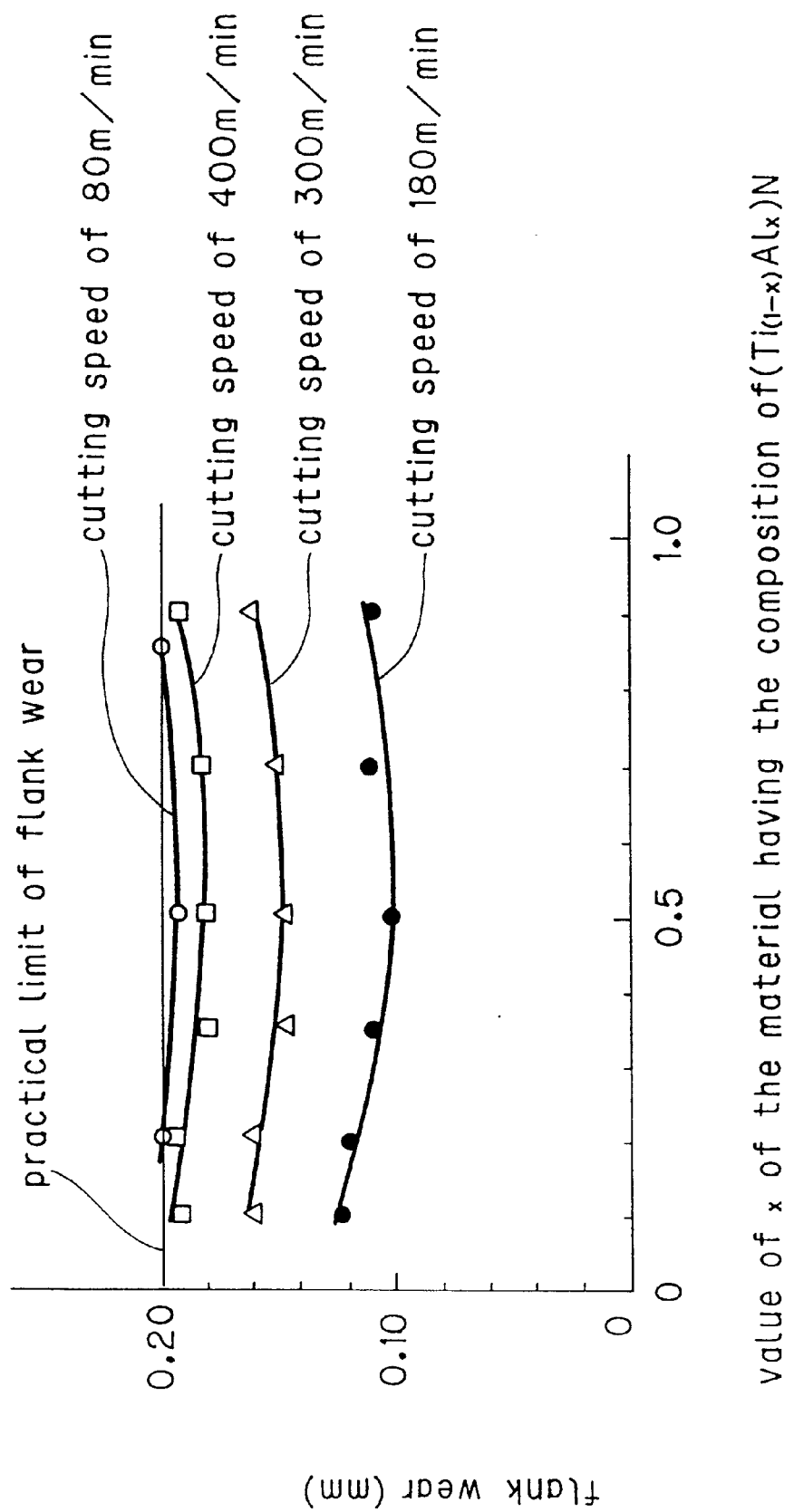
FIG. 2 is a graph showing the state of flank wear.
Figure 3:
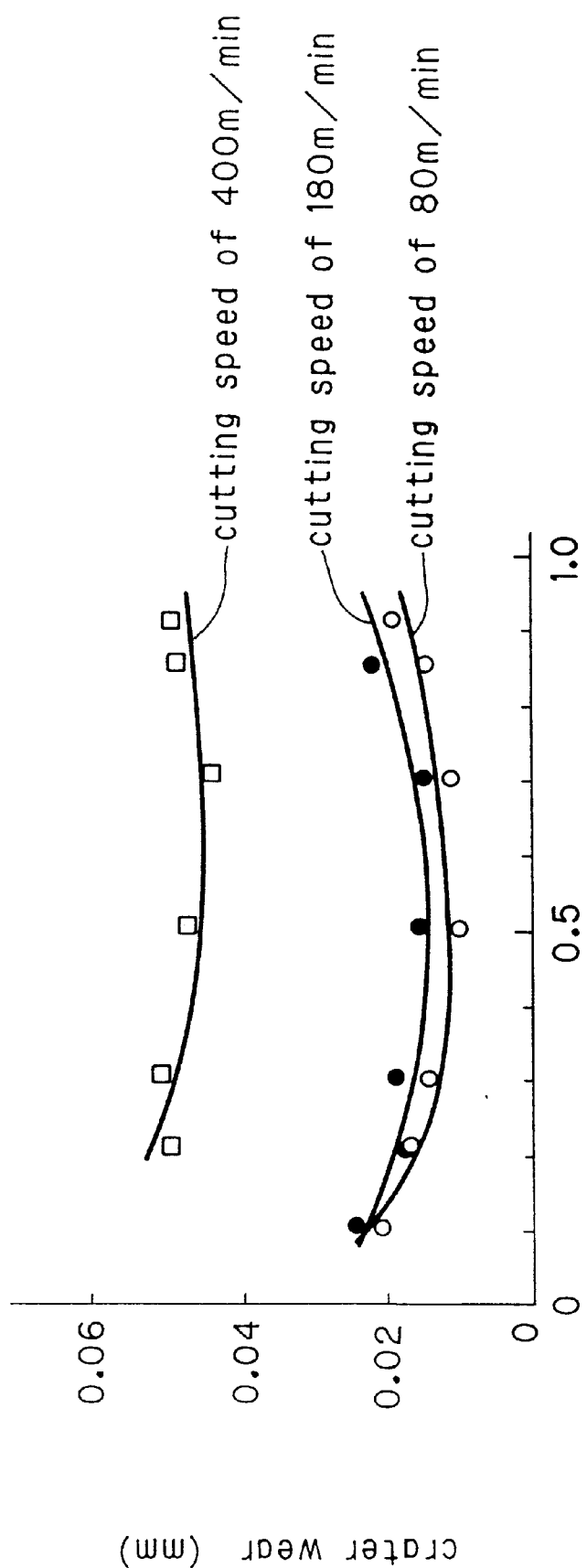
FIG. 3 is a graph showing the state of crater wear.

FIG. 2 illustrates the value of x of the material having the composition of $(Ti_{(1-x)}Al_x)N$ vs. flank wear, and FIG. 3 illustrates the value of x of the material vs. crater wear. In both figures, the hob 16 is made of a high-speed steel having a single-layer coating of the material and it possesses the following characteristics: module m 2.5, the number of threads 3, outside diameter 90 mm, cutting edge length 90 mm, the number of spaces 12. The work 13 has the following characteristics: material SCM435, module m 2.5, the number of teeth 45, face width 30 mm, twist angle 20°. Machining conditions are as follows: axial feed 2 mm/rev, the number of works 13 to be machined 350.

As shown in FIG. 2, the hob 16 having a coating of $(Ti_{(1-x)}Al_x)N$ with an x value in the range of $0.2 \leq x \leq 0.85$ is below a practical limit (0.2 mm) in terms of flank wear at a cutting speed of 80 m/min and is thus employable practically. As the cutting speed increases up to 180 m/min, the flank wear diminishes, and at the cutting sped of 180 m/min, the hob 16 having a coating of $(Ti_{(1-x)}Al_x)N$ with a wider range of x value is within a practicable flank wear. With a further increase of the cutting speed, the flank wear increases, but even at the cutting speed of 400 m/min the hob 16 having a coating of $(Ti_{(1-x)}Al_x)N$ with a wider range of x value than $0.2 \leq x \leq 0.85$ is within the practicable flank wear.

The practical limit of flank wear is 0.2 mm or less, but as to the practical limit of crater wear shown in FIG. 3, it is preferably 0.1 mm or less. As shown in FIG. 3, the crater wear is minimum at a cutting speed of 80 m/min and increases as the cutting speed increases. However, even at a cutting speed as high as 400 m/min the crater wear is 0.05 mm or so, which poses no problem.

Thus, if dry cutting is performed using the hob 16 of a high-speed steel having a coating of $(Ti_{(1-x)}Al_x)N$ with an x value in the range of $0.2 \leq x \leq 0.85$ and at a cutting speed in the range of 80 to 400 m/min, it is possible to realize teeth generation in high efficiency at low cost.

A second embodiment of the gear cutting method of the present invention will now be described. Using a hob 16 made of a high-speed steel (SKH55) and having a single layer 1.7 $\mu$m thick coating of $(Ti_{0.5}Al_{0.5})(N_yC_{(1-y)})$, gear cutting is performed without the supply of cutting oil (dry cutting method).

Figure 4:
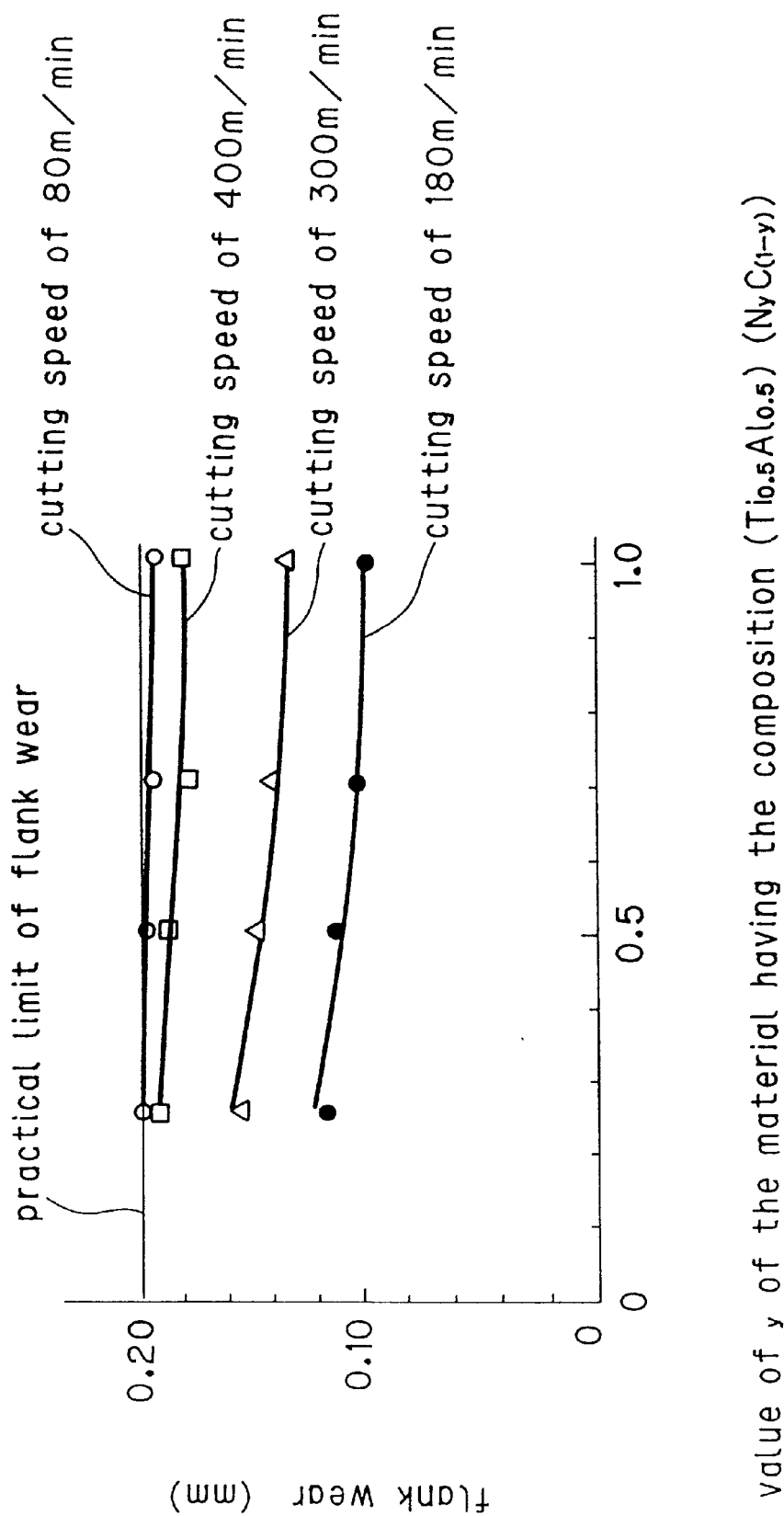
FIG. 4 is a graph showing the state of flank wear.
Figure 5:
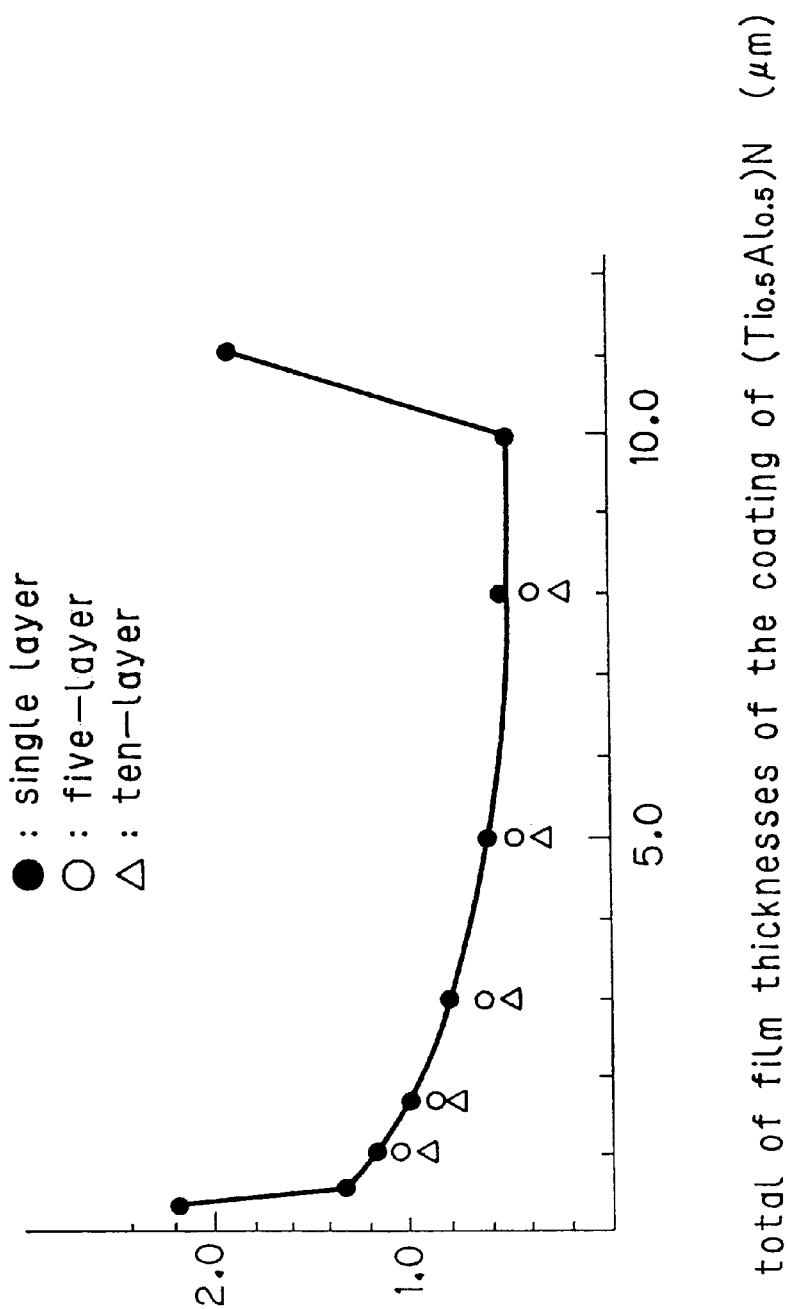
FIG. 5 is a graph showing a relation between film thickness and flank wear.

FIG. 4 shows the value of y of the material having the composition $(Ti_{0.5}Al_{0.5})(N_yC_{(1-y)})$ vs. Flank wear, and FIG. 5 shows a total film thickness of $(Ti_{0.5}Al_{0.5})N$ vs. flank wear ratio with a film thickness of 1.7 $\mu$m as a reference value. In FIGS. 4 and 5, the hob 16 used is made of a high-speed tool steel having a coating of $(Ti_{0.5}Al_{0.5})N$ and its number of threads is 3 and cutting edge length is 90 mm. As to the work 13 used, its material is SCM435 (JIS Cr-Mo Steel), module m 2.5, the number of teeth 45, face width 30 mm, twist angle 20°. As to machining conditions, axial feed is 2 mm/rev and the number of works 13 to be machined is 350.

As shown in FIG. 4, at the cutting speed of 80 m/min the hob 16 having a coating of $(Ti_{0.5}Al_{0.5})(N_yC_{(1-y)})$ with a y value in the range of $0.25 \leq y \leq 1.0$ was below the practical limit (0.2 mm) in terms of flank wear, and at the cutting speed of 180 m/min the flank wear is the minimum. With a further increase of the cutting speed, the flank wear increases, but even at the cutting speed of 400 m/min the flank wear of the hob 16 is within its allowable range. The fact that the wear increases as the value of y becomes smaller is common to all of the cutting speeds. The reason why wear resistance is deteriorated as the value of y becomes smaller is presumed to be because oxidation resistance is deteriorated as a result of increase of C instead of N in the composition of the coating material.

FIG. 5 is a graph for determining an appropriate thickness of the coating of $(Ti_{0.5}Al_{0.5})N$, in which the axis of abscissa represents the total of film thicknesses. In the same figure, if the $(Ti_{0.5}Al_{0.5})N$ coating is a single layer, the thickness thereof is represented, while in the case of a multi-layer coating, the total of all the film thicknesses is represented. The axis of ordinate represents the ratio of flank wear, assuming that the flank wear of the hob 16 having a single layer of 1.7 $\mu$m thick $(Ti_{0.5}Al_{0.5})N$ coating is 1.

The relation between flank wear and film thickness in the case of a single layer $(Ti_{0.5}Al_{0.5})N$ coating shows that at the film thickness of 0.5 $\mu$m the flank wear is about 30% greater than that at the film thickness of 1.7 $\mu$m and that the flank wear diminishes gradually as the film thickness increases. At the film thickness of 10 $\mu$m the flank wear is a half of that at the film thickness of 1.7 $\mu$m. However, at a film thickness as small as 0.3 $\mu$m, the flank wear increases to 2.2 times the flank wear at the film thickness of 1.7 $\mu$m. On the other hand, at the film thickness of 11 $\mu$m, film separation occurs and the wear increases rapidly.

In the case of a multi-layer coating of $(Ti_{0.5}Al_{0.5})N$, for example, in the case of a five- or ten-layer coating with 0.05 $\mu$m thick TiN layer between $(Ti_{0.5}Al_{0.5})N$ layers, a slightly higher performance than in the case of a single layer as shown in FIG. 5 is attained. It is preferable that the film thickness be in the range of 0.5 $\mu$m to 10 $\mu$m, and it is optional whether the coating should be of a single layer or of plural layers.

Thus, if dry cutting is performed using the hob 16 of a high-speed steel having a coating of $(Ti_{0.5}Al_{0.5})(N_yC_{(1-y)})$ with a y value in the range of $0.25 \leq y \leq 1.0$ at a cutting speed in the range from 80 to 400 m/min, teeth generation in high efficiency at low cost can be attained.

Now, the relation of various machining conditions to the cutting speed will be described below in detail with reference to FIGS. 6 to 10.

Figure 6:
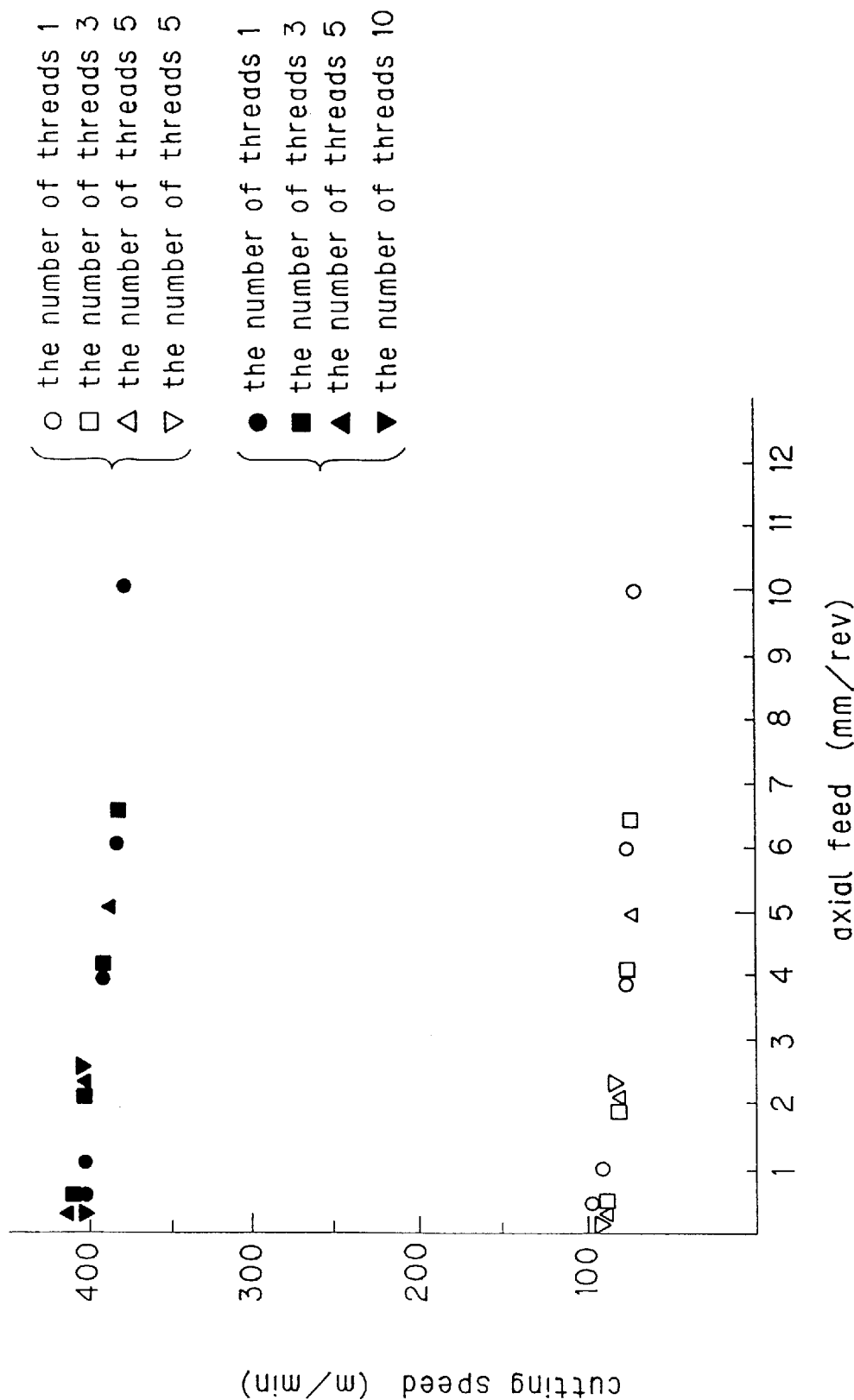
FIG. 6 is a graph showing a relation of axial feed and the number of threads to the cutting speed.

FIG. 6 shows axial feed and the number of threads in the hob vs. cutting speeds falling under a practicable range of flank wear. For each of the various numbers of threads, a relation between axial feed and cutting speed falling under the practicable flank wear range is shown.

In the same figure, the cutting speeds indicated with white marks are cutting speeds at which flank wear begins to fall below the practical range, while the cutting speeds indicated with black marks are cutting speeds at which flank wear begins to exceed the practical range. In other words, the cutting speeds above the white-mark cutting speeds and below the black-mark cutting speeds are employable practically. It can be seen from the same figure that, as a whole, neither the number of threads nor axial feed exerts a great influence upon the cutting speed region in which dry cutting is effective.

As to the cutting speeds at which flank wear begins to fall below the practical range, the higher the axial feed, the lower the cutting speeds, but the degree of the fall is small and it is presumed that at any axial feed the cutting speed is about 80 m/min and that the flank wear is below the practical range. This is also the case even if the number of threads changes. The reason why the cutting speed decreases a little with an increase of axial feed is presumed to be because with an increase of axial feed, the temperature of the cutting edge rises and reaches a level at which cutting is performed efficiently even at a low cutting speed. However, since the influence of axial feed on the cutting edge temperature is fairly small in comparison with the cutting speed, it is presumed that the influence on the cutting speed will be small.

On the other hand, as to the cutting speeds at which flank wear begins to exceed the practical range, the higher the axial feed, the lower the cutting speeds, but the degree of the drop is small and it is presumed that at any axial feed the cutting range is about 400 m/min and that the flank wear exceeds the practical range. This is also the case even if the number of threads changes. The reason why the cutting speed decreases a little with an increase of axial feed is presumed to be because with an increase of axial feed the cutting edge temperature rises and reaches a level at which the high-speed steel softens greatly even at a low cutting speed.

The hob 16 used in the illustrated example has a coating of $(Ti_{0.5}Al_{0.5})N$ and possesses the characteristics of module m 2.5, outside diameter 90 mm, cutting edge length 90 mm, and the number of spaces 12. As to the work 13 used herein, its material is SCM435 and it has the characteristics of module m 2.5, the number of teeth 45, face width 30 mm, and twist angle 20°. It has turned out that the same results as in FIG. 6 were obtained when the hob 16 had a coating of $(Ti_{(1-x)}Al_x)(N_yC_{(1-y)})$ in the ranges of $0.2 \leq x \leq 0.85$ and $0.25 \leq y \leq 1.0$.

Figure 7:
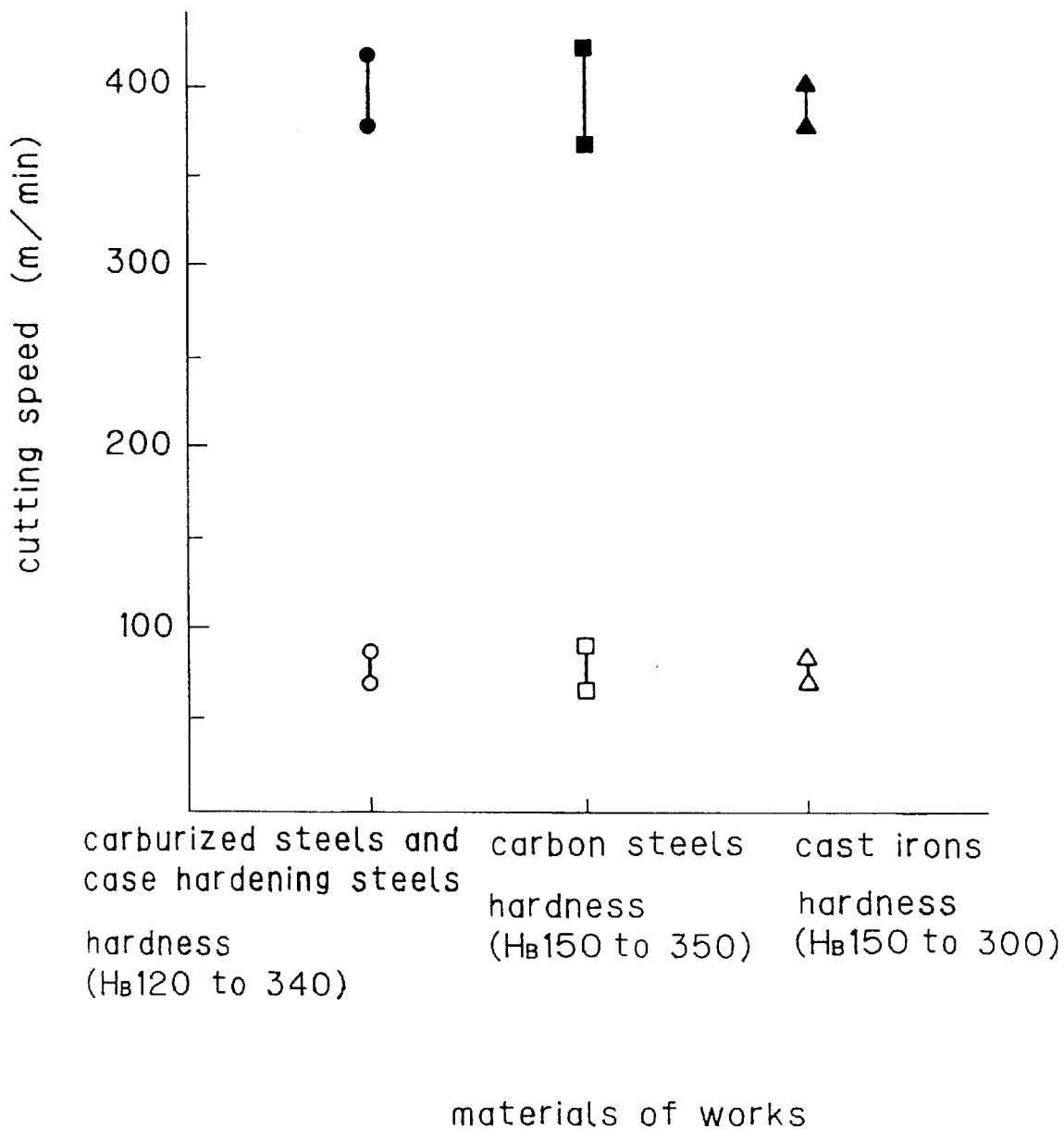
FIG. 7 is a graph showing a relation between works and the cutting speed.

In FIG. 7 there are illustrated materials and hardnesses of works vs. cutting speeds falling under a practicable flank wear range. FIG. 7 shows the results of having checked a cutting speed range in which drying cutting is effective, using a variety of typical gear materials, including carburized steels and case hardening steels e.g. SCM415 (JIS Cr-Mo Steel), SCM435, SCr420 (JIS Cr Steel), and at different hardnesses.

From FIG. 7 it is seen that the cutting speeds at which flank wear begins to fall below the practical range are between 74 m/min and 85 m/min even if the type of steel and hardness thereof change and that the cutting speeds at which flank wear begins to exceed the practical range are between 379 m/min and 418 m/min even at different steel types and hardnesses. It follows that the cutting speed range at which dry cutting is effective is approximately from 80 m/min to 400 m/min. Also as to various carbon steels of different hardnesses and various cast irons of different hardnesses, it is seen from the same figure that dry cutting is effective at a cutting speed in the range of between about 80 m/min and about 400 m/min.

The hob 16 used in the illustrated example has a coating of $(Ti_{0.5}Al_{0.5})N$ and possesses the characteristics of module m 2.5, the number of threads 3, outside diameter 90 mm, cutting edge length 90 mm, and the number of spaces 12. As to the work 13 used herein, it possesses the characteristics of module m 2.5, the number of teeth 45, face width 30 mm, and twist angle 20°. It turned out that the same results as in FIG. 7 were obtained when the hob 16 had a coating of $(Ti_{(1-x)}Al_x)(N_yC_{(1-y)})$ in the ranges of $0.2 \leq x \leq 0.85$ and $0.25 \leq y \leq 1.0$.

Figure 8:
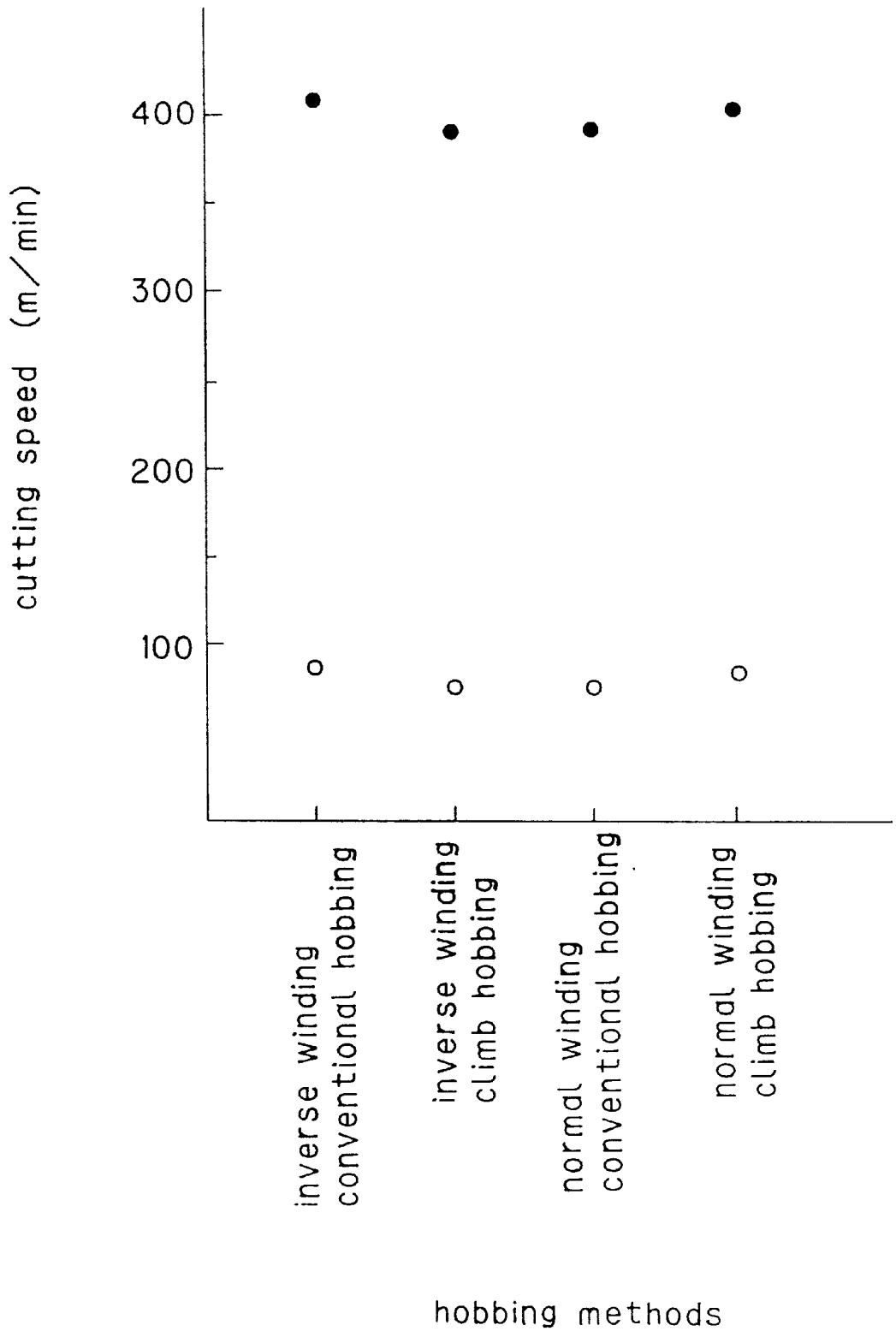
FIG. 8 is a graph showing a relation between gear cutting methods and the cutting speed.

FIG. 8 illustrates hobbing methods vs. cutting speeds falling under a practicable flank wear range. To be more specific, as hobbing methods inverse or normal winding conventional hobbing and inverse or normal winding climb hobbing are known. FIG. 8 shows the results of having checked a cutting speed range in which dry cutting is effective, with respect to each of those hobbing methods.

In the same figure, the cutting speeds indicated by white marks represent cutting speeds at which flank wear begins to fall below the practical range, while the cutting speeds indicated by black marks represent cutting speeds at which flank wear begins to exceed the practical range. It is seen from the same figure that the cutting range in which dry cutting is effective somewhat differs depending on the four types of hobbing methods but is in the range of between about 80 m/min and 400 m/min.

The hob 16 used in the illustrated example has a coating of $(Ti_{0.5}Al_{0.5})N$ and possesses the characteristics of module m 2.5, the number of threads 3, outside diameter 90 mm, cutting edge length 90 mm, and the number of spaces 12. As to the work 13 used herein, its material is SCM435, module m 2.5, the number of teeth 45, face width 30 mm, and twist angle 20°. It turned out that the same results as in FIG. 8 were obtained when the hob 16 had a coating of $(Ti_{(1-x)}Al_x)(N_yC_{(1-y)})$ in the ranges of $0.2 \leq x \leq 0.85$ and $0.25 \leq y \leq 1.0$.

Figure 9:
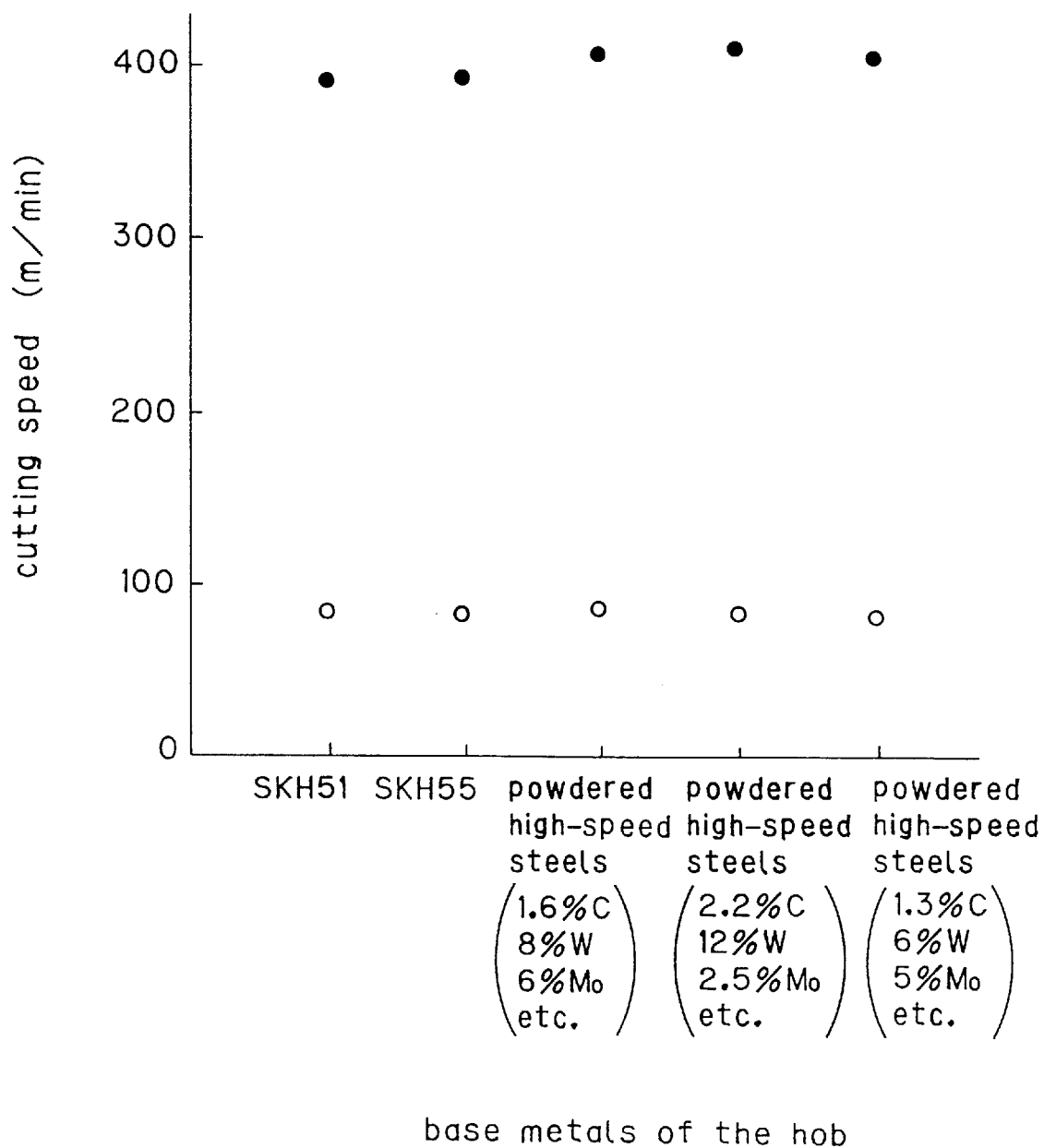
FIG. 9 is a graph showing a relation between base metals of a hob and the cutting speed.

FIG. 9 illustrates base metals of the hob vs. cutting speeds falling under a practicable flank wear range. More specifically, for example, SKH51 (JIS high-speed tool steel), SKH55, and powdered high-speed steels (1.6%C, 8%W, 8%Mo, etc.) (2.2%C, 12%W, 2.5%Mo, etc.) (1.3%C, 6%W, 5%Mo, etc.) were used as base materials of the hob 16 and a cutting speed range effective for dry cutting was checked with respect to each of those materials.

In the same figure, the cutting speeds indicated by white marks represent cutting speeds at which flank wear begins to fall below the practical flank wear range, while the cutting speeds indicated by black marks represent cutting speeds at which flank wear begins to exceed the practical flank wear range. It is seen from the same figure that the cutting speed range, in which dry cutting is effective, is in the range of between about 80 m/min and about 400 m/min irrespective of base metals.

It is the material of the coating film, not the material of the base metal, that determines the cutting speed at which flank wear begins to fall below the practical range. For this reason, a significant difference in the cutting speed effective for dry cutting will not occur even if the material of the base metal of the hob 16 differs. As to the cutting speed at which flank wear begins to exceed the practical range, it is related to the softening temperature of the base metal and hence, a great difference in the softening temperature even does not occur if the components of high-speed steels are different. For this reason, a marked difference in the cutting speed effective for dry cutting will not occur even if the material of base metal of the hob 16 differs.

The hob 16 used in the illustrated example has a coating of $(Ti_{0.5}Al_{0.5})N$ and possesses the characteristics of module m 2.5, the number of threads 3, outside diameter 90 mm, cutting edge length 90 mm, and the number of spaces 12. As to the work 13 used herein, it possesses the characteristics of module m 2.5, the number of teeth 45, face with 30 mm, and twist angle 20°. It has turned out that the same results as in FIG. 9 were obtained when the hob 16 had a coating of $(Ti_{(1-x)}Al_x)(N_yC_{(1-y)})$ in the ranges of $0.2 \leq x \leq 0.85$ and $0.25 \leq y \leq 1.0$.

Figure 10:
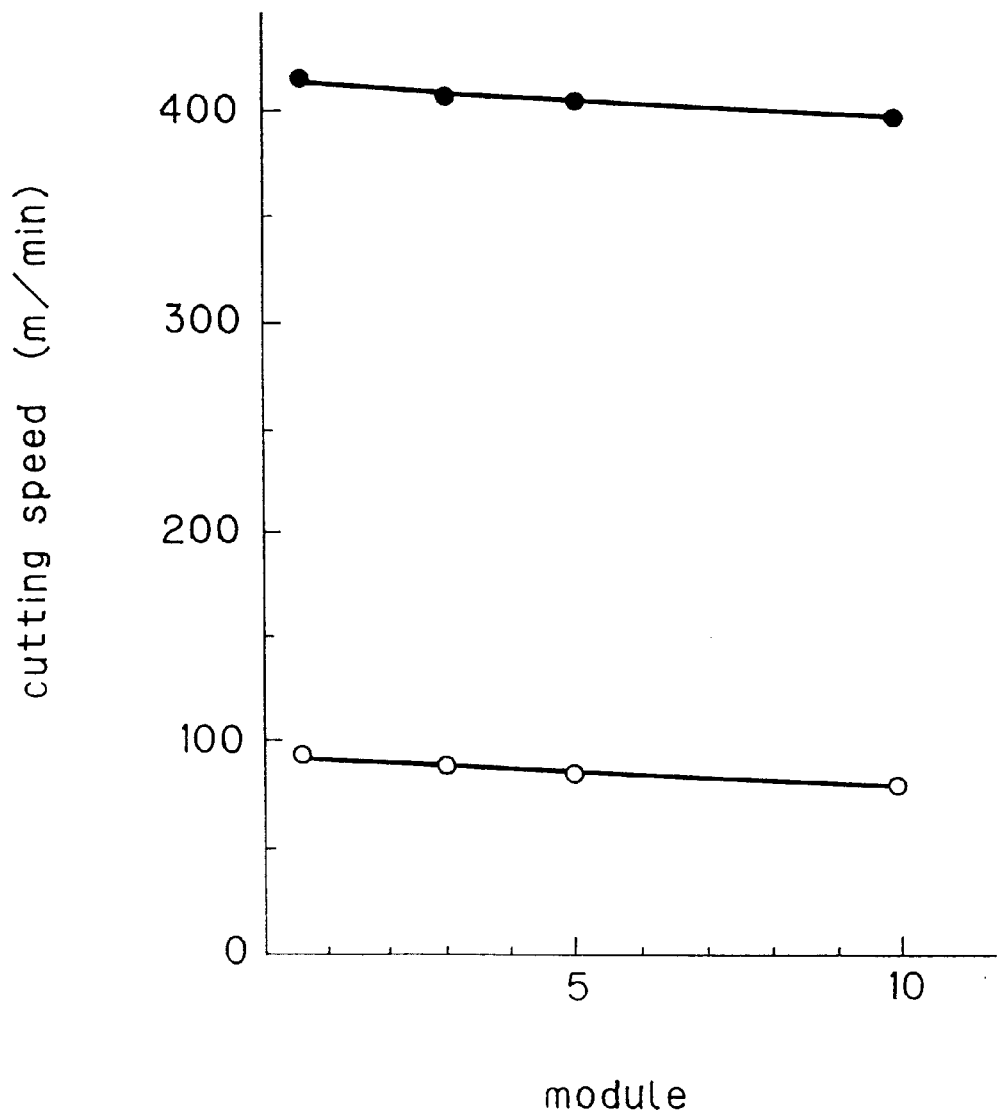
FIG. 10 is a graph showing a relation between module and the cutting speed.

FIG. 10 illustrates modules vs. cutting speeds falling under a practicable flank wear range. More particularly, in FIG. 10, an effective cutting speed region for dry cutting with changes in module of the hob 16 is shown.

In the same figure, the cutting speeds indicated by white marks represent cutting speeds at which flank wear begins to fall below the practical range, while the cutting speeds indicated by black marks represent cutting speeds at which flank wear begins to exceed the practical range. Although the cutting speed at which flank wear begins to fall below the practical range somewhat decreases with an increase of module, it is seen that the cutting speed is about 80 m/min. On the other hand, the cutting speed at which flank wear begins to exceed the practical range somewhat decreases as the module increases, but it is about 400 m/min. Thus, even if the module of the hob 16 changes, the effective cutting speed range for dry cutting is from 80 to 400 m/min.

The hob 16 used in the illustrated example has a coating of $(Ti_{0.5}Al_{0.5})N$ and possesses the characteristics of the number of threads 3, outside diameter 90 mm, cutting edge length 90 mm, and the number of spaces 12, at a module of 2.5. At other modules, the outside diameter and the shape of teeth are made corresponding to (module/2.5) times the value at module 2.5, the cutting edge length is set at a length sufficient for cutting, the number of threads is 3, and the number of spaces is 12. As to the work 13 used herein, its material is SCM435 and it possesses the characteristics of the number of teeth 45, face width 30 mm, and a twist angle 20°. It has turned out that the same results as in FIG. 10 were obtained when the hob 16 had a coating of $(Ti_{(1-x)}Al_x)(N_yC_{(1-y)})$ in the ranges of $0.2 \leq x \leq 0.85$ and $0.25 \leq y \leq 1.0$.

Figure 11:
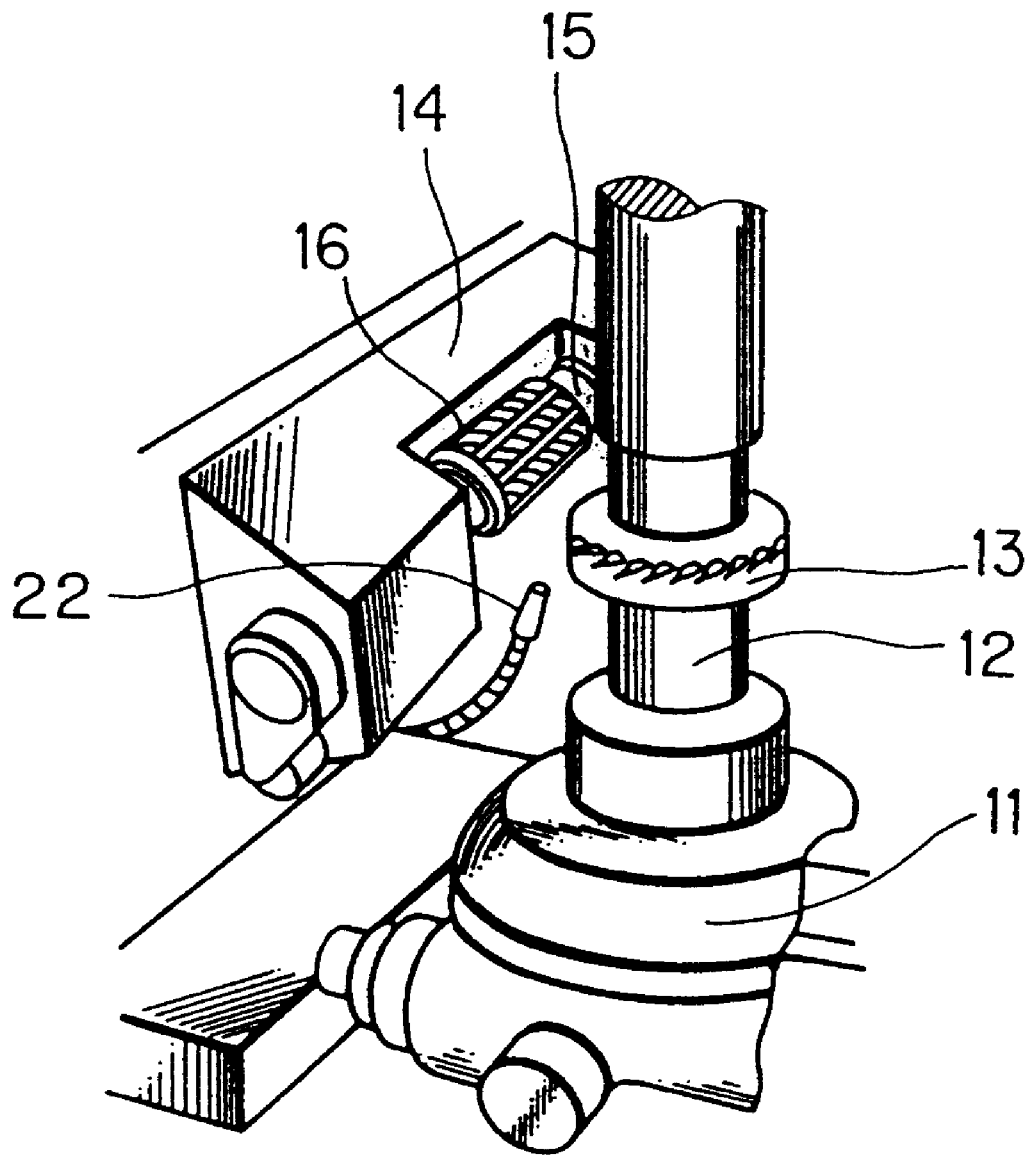
FIG. 11 is a schematic construction diagram of a cutting portion of another hobbing machine which is employable for carrying out the gear cutting method of the present invention.
Figure 12:
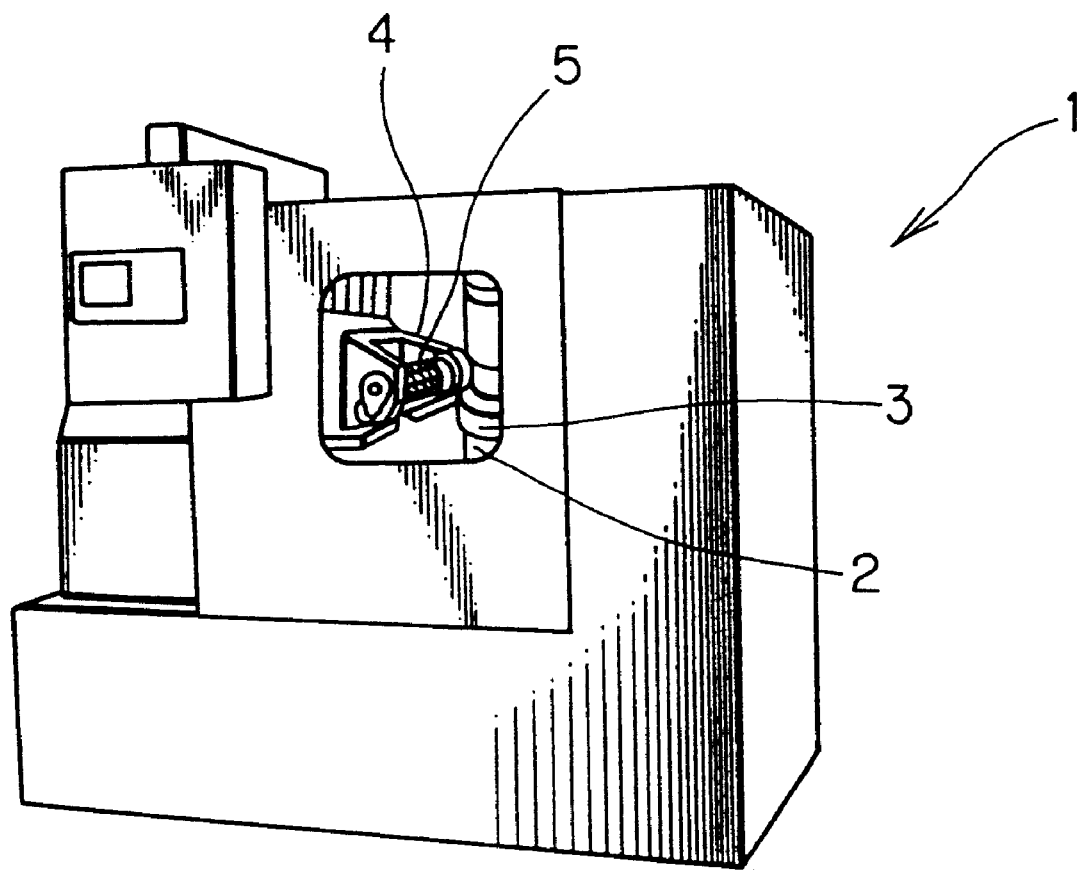
FIG. 12 is an entire construction diagram of a conventional hobbing machine.
Figure 13:
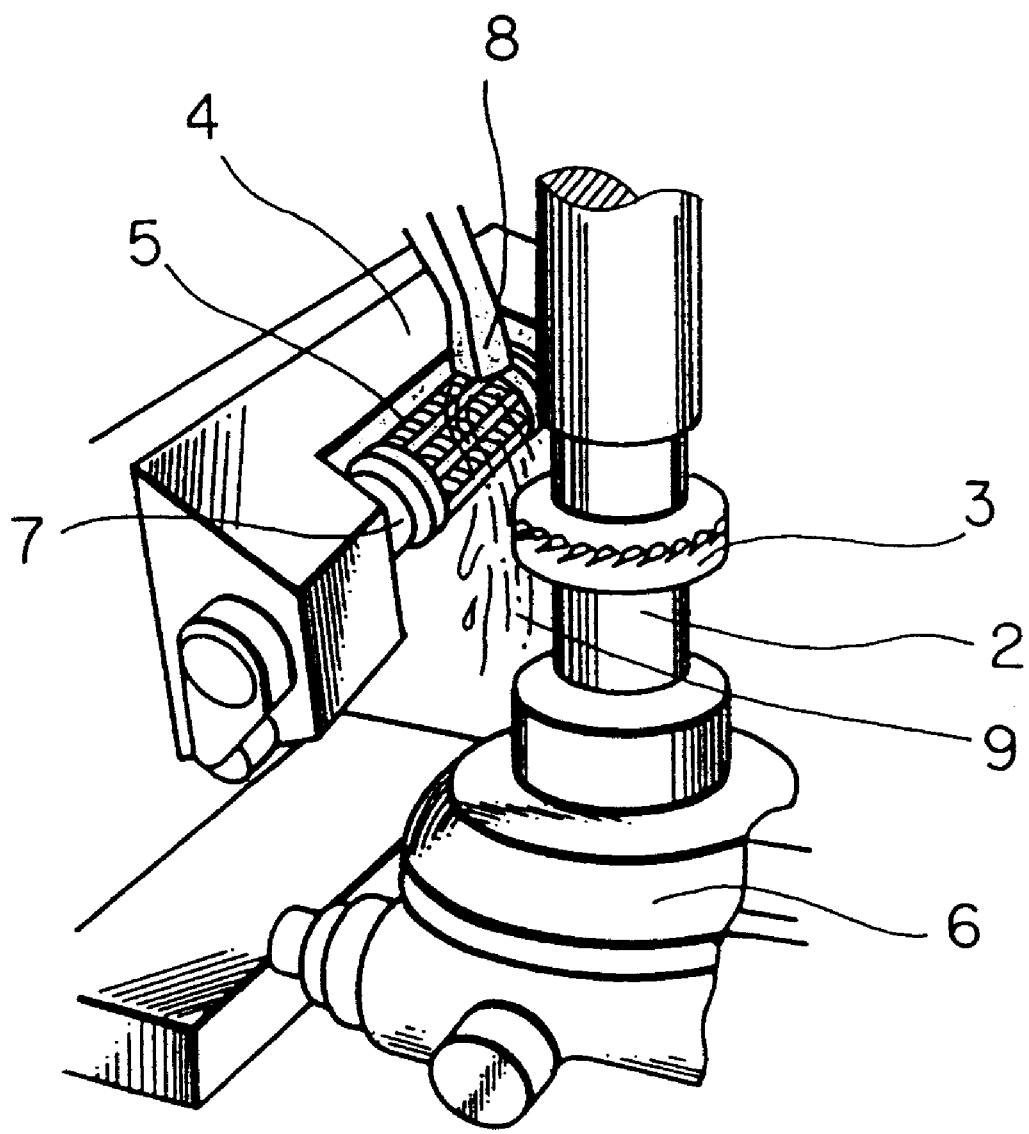
FIG. 13 illustrates the details of a cutting portion of the conventional hobbing machine.

Another hobbing machine for carrying out the gear cutting method of the present invention will now be described with reference to FIG. 11, which schematically illustrates a cutting portion of the hobbing machine. This hobbing machine is equipped with an air nozzle 22 for blowing air against a cutting portion including a work 13 and a hob 16. Other constructional points are those of the hobbing machine shown in FIGS. 1 and 2.

The hobbing machine of this embodiment performs a gear cutting operation with the hob 16 while blowing air against the cutting portion, whereby chips resulting from the cutting operation can be blown off and removed. It is also possible to mix a small amount of cutting oil into air and blow the mixture as mist against the cutting portion. By performing the gear cutting operation while blowing air from the air nozzle 22, it is possible to effect gear generation in high efficiency at low cost and without including chips in the cutting portion.

As set forth hereinabove, the present invention is a gear cutting method for teeth generation with use of a hob having a cutting edge portion made of a high-speed tool steel, wherein the hob is coated with at least one layer of a film of a composition comprising:

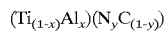

$0.2 \leq x \leq 0.85$
$0.25 \leq y \leq 1.0$ and wherein teeth are generated by dry cutting at a cutting speed in the range from 80 m/min to 400 m/min while air is blown against a cutting portion without using a cutting oil. According to this construction, the cutting speed in teeth generation can be greatly improved without using an expensive tool such as a tool made of cemented carbide. As a result, it becomes possible to effect gear cutting in high efficiency at low cost.

In addition, since air is blown against the cutting portion during teeth generation, the inclusion of chips in the cutting portion does not occur and hence it is possible to effect teeth generation in high efficiency at low cost.

The invention being thus described, it will be obvious that the same may be varied in many ways. Such variations are not to be regarded as a departure from the spirit and scope of the invention, and all of the modifications as would be obvious to one skilled in the art are intended to be included within the scope of the following claims.

What is claimed is:

1. A gear cutting method for teeth generation by a hob having a cutting edge portion made of a high-speed tool steel, comprising:
   coating said hob with at least one layer of film having a composition including $(Ti_{(1-x)}Al_x)(N_yC_{(1-y)})$ where, $0.2 \leq x \leq 0.85$ and $0.25 \leq y \leq 1.0$; and
   generating the teeth by dry cutting at a speed in the range of 80 m/min to 400 m/min.

2. The gear cutting method of claim 1, wherein said coating step includes,
   coating said hob with at least one layer of film having a composition including $(Ti_{(1-x)}Al_x)N$, where, $0.2 \leq x \leq 0.85$.

3. The gear cutting method of claim 1, wherein said coating step includes,
   coating said hob with at least one layer of film having a composition including $(Ti_{0.5}Al_{0.5})(N_yC_{(1-y)})$, where $0.25 \leq y \leq 1.0$.

4. The gear cutting method of claim 1, wherein said coating step includes,
   coating said hob with at least one layer of film having a composition including $(Ti_{0.5}Al_{0.5})N$.

5. The cutting method according to claim 1, wherein said coating step includes the step of,
   providing the film having a thickness of 0.5 to 10 μm.

6. The gear cutting method of claim 5, wherein said providing step includes the step of,
   providing the film having a thickness of 1.7 μm.

7. The gear cutting method of claim 4, wherein said coating step includes the step of, coating said hob with five to ten layers of a 0.05 μm thick film of TiN and the film of $(Ti_{0.5}Al_{0.5})N$ such that the TiN film is sandwiched in between layers of said $(Ti_{0.5}Al_{0.5})N$ film, wherein the total film layer thickness is in the range of 0.5 to 10 μm.

8. The gear cutting method of claim 1, further comprising:
   blowing air against a cutting portion during said generating step.

9. The gear cutting method of claim 1, wherein said generating step includes the step blowing air against a cutting portion without using a cutting oil.

10. The cutting method according to claim 2, wherein said coating step includes the step coating the film at a thickness of 0.5 μm to 10 μm.

11. The gear cutting method of claim 10, wherein said providing step includes the step providing the film at a thickness of 1.7 μm.

12. The cutting method according to claim 3, wherein said coating step includes the step coating the film at a thickness of 0.5 μm to 10 μm.

13. The gear cutting method of claim 12, wherein said providing step includes the step providing the film at a thickness of 1.7 μm.

14. The cutting method according to claim 4, wherein said coating step includes the step coating the film at a thickness of 0.5 μm to 10 μm.

15. The gear cutting method of claim 14, wherein said providing step includes the step providing the film at a thickness of 1.7 μm.

16. The gear cutting method of claim 2, further comprising:
   blowing air against a cutting portion during said generating step.

17. The gear cutting method of claim 3, further comprising:
   blowing air against a cutting portion during said generating step.

18. The gear cutting method of claim 4, further comprising:
   blowing air against a cutting portion during said generating step.

19. The gear cutting method of claim 5, further comprising:
   blowing air against a cutting portion during said generating step.

20. The gear cutting method of claim 6, further comprising:
   blowing air against a cutting portion during said generating step.

21. The gear cutting method of claim 7, further comprising: blowing air against a cutting portion during said generating step.

22. A gear cutting apparatus, comprising:
   a hob having a cutting edge portion made of a high-speed tool steel;
   at least one layer of film coating said hob, said film having a composition including $(Ti_{(1-x)}Al_x)(N_yC_{(1-y)})$, where, $0.2 \leq x \leq 0.85$ and $0.25 \leq y \leq 1.0$; and
   rotating means for rotating said cutting edge of said hob at a speed in the range of 80 m/min to 400 m/min to perform a dry cutting.

23. The gear cutting apparatus of claim 22, comprising:
   at least one layer of film coating said hob, said film having a composition including $(Ti_{(1-x)}Al_x)N$, where, $0.2 \leq x \leq 0.85$.

24. The gear cutting apparatus of claim 22, comprising:
   at least one layer of film coating said hob, said film having a composition including $(Ti_{0.5}Al_{0.5})(N_yC_{(1-y)})$, where $0.25 \leq y \leq 1.0$.

25. The gear cutting apparatus of claim 22, comprising:
   at least one layer of film coating said hob, said film having a composition including $(Ti_{0.5}Al_{0.5})N$.

26. The gear cutting apparatus of claim 22, comprising:
   means for providing the film having a thickness of 0.5 to 10 μm.

27. The gear cutting apparatus of claim 26, wherein said providing means includes the step of,
   providing the film having a thickness of 1.7 μm.

28. The gear cutting apparatus of claim 25, comprising:
   means for coating said hob with five to ten layers of a 0.05 μm thick film of TiN and the film of $(Ti_{0.5}Al_{0.5})N$ such that the TiN film is sandwiched in between layers of said $(Ti_{0.5}Al_{0.5})N$ film, wherein the total film layer thickness is in the range of 0.5 to 10 μm.

29. The gear cutting apparatus of claim 22, further comprising:
   means for blowing air against a cutting portion during said generating step.

* * * * *